United States Patent [19]

Kanno et al.

[11] 4,201,673

[45] May 6, 1980

[54] APPARATUS FOR DIALYSIS OF SOLUTION

[75] Inventors: Michio Kanno, Hino; Akira Igari, Tokyo, both of Japan

[73] Assignee: Terumo Corporation, Tokyo, Japan

[21] Appl. No.: 920,717

[22] Filed: Jun. 30, 1978

[30] Foreign Application Priority Data

Jul. 4, 1977 [JP] Japan .................................. 52-79709
Aug. 4, 1977 [JP] Japan ........................... 52-104564[U]

[51] Int. Cl.² .............................................. B01D 31/00
[52] U.S. Cl. ............................ 210/321 B; 210/323 T; 210/456
[58] Field of Search ........... 210/321 A, 321 R, 321 B, 210/456, 323 T; 55/16

[56] References Cited

U.S. PATENT DOCUMENTS

| | | | |
|---|---|---|---|
| 3,503,515 | 3/1970 | Tomsic | 210/500 M |
| 3,953,334 | 4/1976 | Brun et al. | 210/321 R |
| 4,031,012 | 6/1977 | Gics | 210/321 A |

FOREIGN PATENT DOCUMENTS

| | | | |
|---|---|---|---|
| 2267138 | 11/1975 | France | 210/321 R |
| 7602880 | 5/1976 | Netherlands | 210/321 |

OTHER PUBLICATIONS

Chemical Engineers' Handbook, Fifth Ed., R. H. Perry et al., McGraw-Hill Book Company, N.Y., 1973, pp. 5-33 to 5-37, and 17-40.
The American Heritage Dictionary, W. Morris, Editor, Houghton Mifflin Co., 1976, p. 329.
Transport Phenomena, R. B. Bird et al., John Wiley & Sons Publ. N.Y., 1960, pp. 153-157 and 47.

Primary Examiner—Charles N. Hart
Assistant Examiner—David R. Sadowski
Attorney, Agent, or Firm—Frishauf, Holtz, Goodman and Woodward

[57] ABSTRACT

A dialyzer comprises a housing, a plurality of hollow fibers extending in the housing parallel to one another, solution inlet and outlet ports provided at the ends of the housing through respective seal members, respectively and communicating with liquid passages inside the hollow fibers, and dialysate inlet and outlet ports provided near the ends of the housing, respectively, and communicating with a liquid passage outside the hollow fibers. The dialysate inlet port has a diameter of 1.5 to 3.5 mm, and the dialysate outlet port has a diameter of 6 to 10 mm.

13 Claims, 3 Drawing Figures

APPARATUS FOR DIALYSIS OF SOLUTION

BACKGROUND OF THE INVENTION

This invention relates to a dyalyzer using hollow fibers, in which a dialysate can flow uniformly through a space between any adjacent hollow fibers and which can be effectively worked when used as an artifical kidney.

Such a dialyzer as illustrated in FIG. 1 is known. The known dialyzer comprises a bundle of about 10,000 hollow fibers 1 made of a semi-permeable material such as regenerated cellulose. The fibers 1 have an inner diameter of 200 to 300 microns and are arranged densely in a cylindrical housing 2 made of a synthetic resin and having both ends open. The fibers 1 are secured to the housing 2 in a liquid-tight fashion by a high molecular adhesive agent 3 such as polyurethane resin. The hollow fibers 1 are made to communicate at one end with a solution inlet port 4 and at the other end with a solution outlet port 5. The peripheral wall of the housing 2 is provided with a dialysate inlet port 6 and a dialysate outlet port 7 near the respective ends of the housing 2. Through the dialysate inlet port 6 a dialysate is introduced into the housing 2 to flow through the exterior of the hollow fibers 1. Through the dialysate outlet port 7 the dialysate is discharged from the housing 2. To elevate the dialysis efficiency, a dialyzer of this type is installed in a substantially vertical position, and the solution, e.g. blood, and the dialysate are made to flow downwards and upwards, respectively.

In the above-described dialyzer, however, the dialysate flows only along particular portions of the hollow fibers 1, not uniformly along the entire fibers 1, as indicated by arrows in FIG. 1. This undesirable phenomenon is called "channeling". If channeling takes place, some portions of the fibers 1 indicated by "A" in FIG. 1 do not work for dialysis. That is, the dialysate comes into a good contact with those portions of the fibers 1 which are near dialysate ports 6 and 7, and as for the other portions of the fibers 1 it tends to flow where it meets less resistance. Further, the dialysate cannot come into a good contact with the innermost fibers, though it may be sufficiently contacted with the outermost fibers.

In order to avoid channeling, a dialyzer with a so-called "overflow mechanism" has been invented. The overflow mechanism is constituted by two annular ribs which support the hollow fibers in the vicinity of the dialysate inlet port and the dialysate outlet port, respectively. In this type of a dialyzer, the dialysate outlet port is provided below the upper edge of the annular rib, so that the dialysate is sucked up and uniformly flows over the edge of the rib and discharged through the dialysate outlet port. As a result, the dialysate can flow all along at least outermost ones of the hollow fibers. Indeed the overflow mechanism helps enhance the dialysis efficiency to some degree, but it fails to improve the dialysis efficiency at the innermost hollow fibers.

SUMMARY OF INVENTION

Accordingly an object of this invention is to provide a dialyzer having hollow fibers, wherein a dialysate can come into as uniform a contact as possible with all the hollow fibers, thereby to elevate dialysis efficiency.

A dialyzer according to this invention comprises a cylindrical housing with both ends open, a plurality of elongated hollow fibers arranged within the housing substantially parallel to the axis thereof, a pair of seal members for securing the end portions of the hollow fibers to the housing in a liquid-tight fashion and for separating liquid passages inside the hollow fibers from a liquid passage outside the hollow fibers, a dialysate inlet port provided at one end of the housing near one of the seal members and communicating with one end of the liquid passage outside the hollow fibers, a dialysate outlet port provided at the other end of the housing near the other seal member and communicating with the other end of the liquid passage outside the hollow fibers, a solution inlet port and a solution outlet port provided at the ends of the housing, respectively and communicating with the liquid passages inside the hollow fibers, means for sealing the solution inlet and outlet ports to the respective ends of the housing so that they are out of communication with the dialysate inlet and outlet ports, and a dialysate deflection or dispersion member disposed in the vicinity of at least the dialysate inlet and outlet ports for dispersing a flow of dialysate. The dialysate inlet port has a diameter of 1.5 to 3.5 mm, and the dialysate outlet port has a diameter of 6 to 10 mm.

DETAILED DESCRIPTION OF THE PREFERRED EMBODIMENTS

Figure 1:
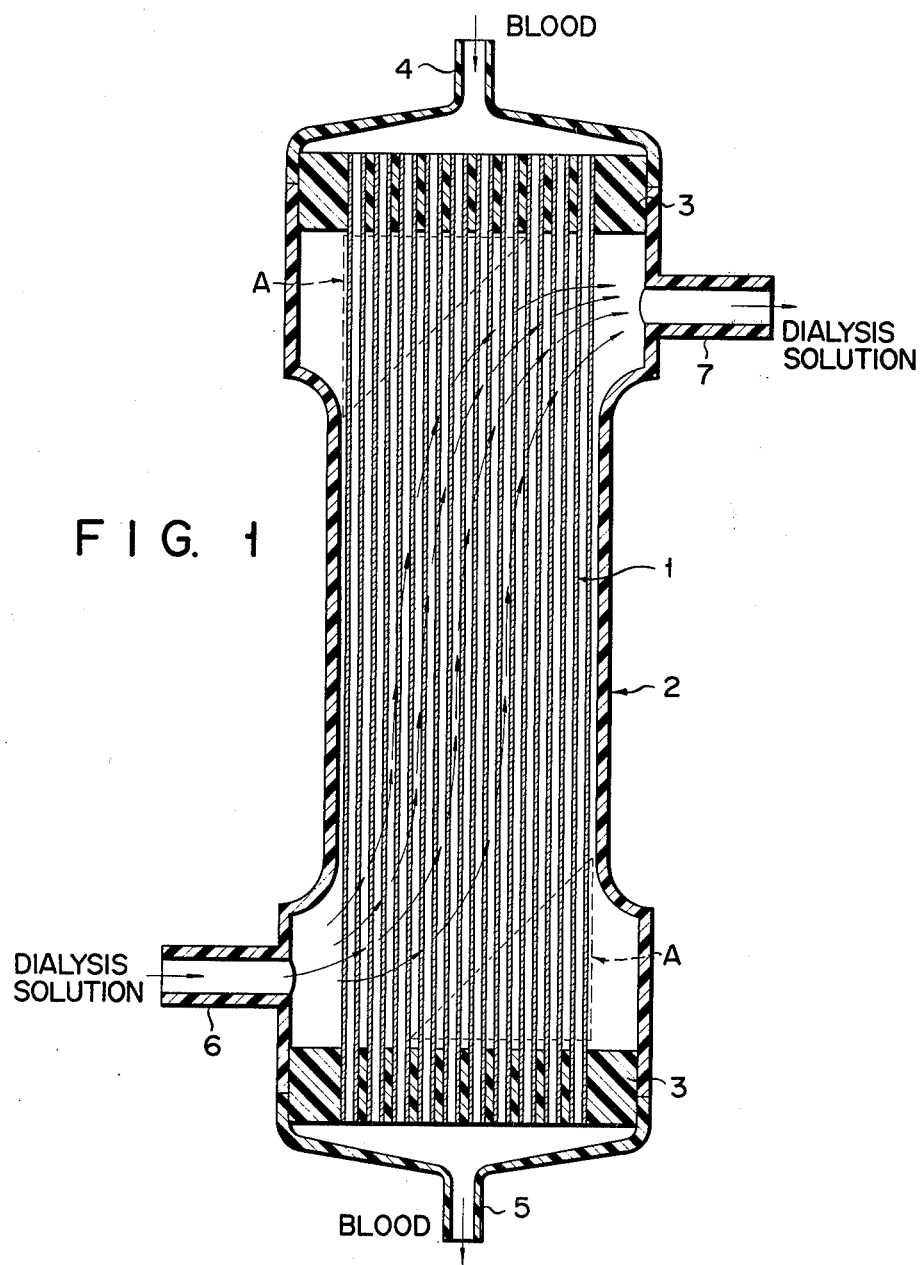
FIG. 1 is a cross sectional view of a prior art dialyzer having hollow fibers.
Figure 2:
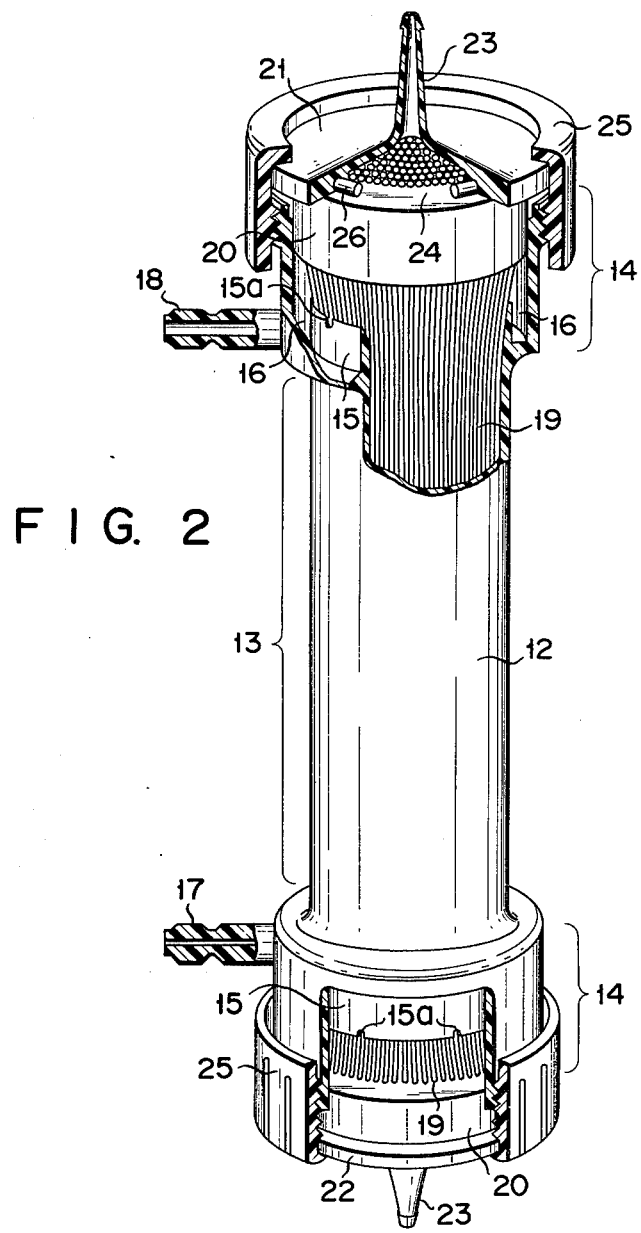
FIG. 2 is a partly broken away, perspective view of a dialyzer according to this invention.

Shown in FIG. 2 is one embodiment of this invention which is designed to function as a blood dialyzer. The upper and lower halves of this dialyzer are symmetrical to each other. Except for dialysate ports and solution ports, all the constituent members of the upper half are idential with the corresponding members of the lower half. Every pair of identical members are therefore represented by the same reference numeral.

The dialyzer shown in FIG. 2 comprises a cylindrical housing 12 made of, for example, polycarbonate resin or acrylonitrile styrene resin. The housing 12 comprises a thin hollow cylinder 13 and a pair of thick hollow cylinders 14. Both ends of the thin cylinder 13 are open and the respective ends are connected to respective thick cylinders 14. Two annular ribs 15 protrude from the ends of the thin cylinder 13 into the thick cylinders 14 to the same extent so that an identical annular space 16 is provided between each thick cylinder 14 and the respective annular rib 15. The lower thick cylinder 14 is provided with a dialysate inlet port 17, and the upper thick cylinder 14 with a dialysate outlet port 18. The dialysate ports 17 and 18 communicate with the respective annular spaces 16. The housing 12 constituted by the thin cylinder 13, thick cylinders 14, annular ribs 15 and dialysate ports 17 and 18 can be integrally formed by injection molding.

About 10,000 hollow fibers 19 are arranged densely in the housing 12, substantially parallel to the axis thereof. The fibers 19 are long enough to extend beyond the annular ribs 15. They are held at one end by a seal member 20 and at the other end by a seal member 20. These fibers 19 extend beyond the annular ribs 15 for such a distance that between each rib 15 and the adjacent seal member 20 there is provided a gap through which a dialysate can pass. The annular ribs 15 serve as deflection or dispersion members for dialysate in the end portions of the cylinder 12.

The seal members 20 secure the end portions of the hollow fibers 19 to the housing 12 in a liquid-tight fashion. Since both ends of the housing are closed by the seal members 20, the spaces among the fibers 19 within the housing 12 act as a dialysate passage. The hollow fibers 19, which work as solution passages, penetrate the seal members 20 and open at both ends outside the seal members 20. In order to prevent a blood-clot, it is preferred that the opposite open ends of each hollow fiber 19 should be on the same plane with the outer surface of the respective seal members 20. The so-called centrifugal injection method, for example as described in U.S. Pat. No. 3,339,341 is generally employed to secure the end portions of hollow fibers, wherein an adhesive agent such as polyurethane is applied into gaps among the hollow fibers and allowed to solidify, thus steadfastly holding the fibers. This technique of holding hollow fibers is known as "potting". After the potting, those portions of the hollow fibers which protrude from the seal members 20, i.e. solified adhesive agent, are cut off.

The seal members 20 should be made of such material as would not be poisonous and as would not collapse the hollow fibers 19. Polyurethane is the best known material to meet both requirements and is most widely used to form seal members.

The dialysate inlet and outlet ports 17 and 18 are provided on the wall portions of the housing 12 that face the respective annular rib deflection members 15. Thus, dialysate is introduced from the inlet port 17 and passes through the exterior of the hollow fibers 19 toward the outlet port 18. The diameter of the dialysate inlet port 17 is made smaller than the dialysate outlet port 18. Preferably the diameter of the dialysate outlet port 18 is 6 to 10 mm, and the diameter of the dialysate inlet port 17 is 1.5 to 3.5 mm. If the dialysate ports 17 and 18 have such diameters, the dialysate can come into a uniform contact with every hollow fiber 19, and the pressure difference between the dialysate and blood can be kept below the permitted limit of, for example, about 50 mm Hg.

Figure 3:
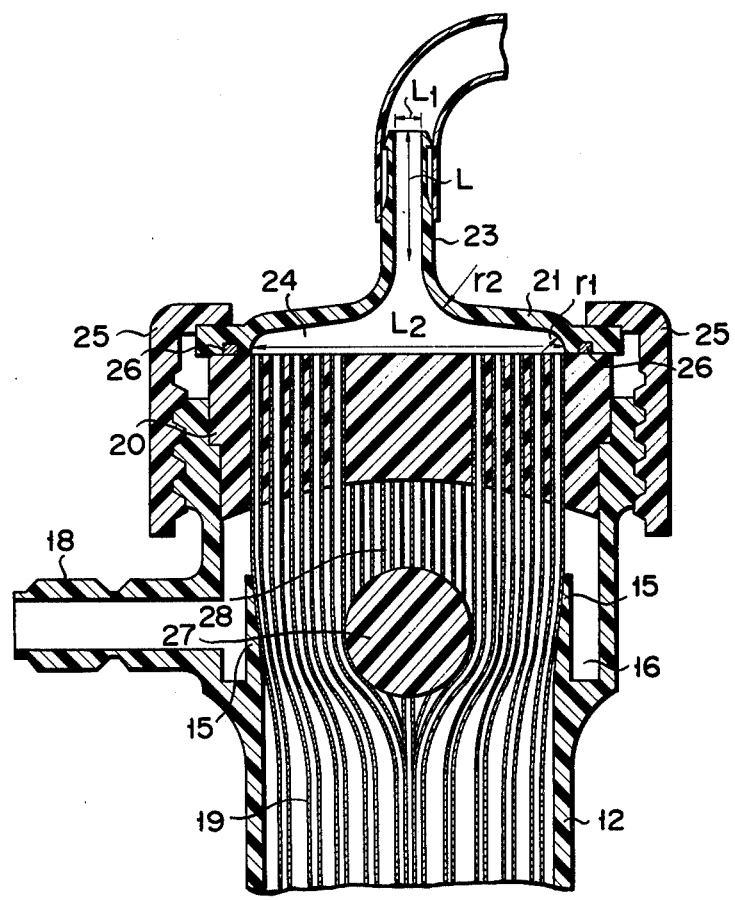
FIG. 3 is an enlarged, cross sectional view of a part of another embodiment of this invention.

The upper end of the housing 12 is provided with a funnel-shaped blood inlet port 21, and the lower end of the housing 12 with a funnel-shaped blood outlet port 22. The blood ports 21 and 22 cover the seal members 20, respectively, and thus communicate with the interiors of the hollow fibers 19 or blood passages. They are made of, for example, polypropylene. Blood is introduced into the hollow fibers 19 through the blood inlet port 21 and is collected in the blood outlet port 22. As shown in FIG. 3, each blood port comprises a pipe portion 23 and a cup portion 24. The pipe portion 23 is connected to a tube of a blood circuit (not shown). Each blood port is secured onto the seal member 20 by means of a cap 25 in screw engagement with the periphery of the thick cylinder 14. To prevent the blood from leaking through between the seal member 20 and the cup portion 24, an annular packing made of, for instance, silicon rubber should be interposed between the seal member 20 and the cup portion 24.

FIG. 3 shows a top part of another embodiment of this invention which is identical with the dialyzer shown in FIG. 2 except that a support member 27 is provided to achieve a uniform distribution of blood to the hollow fibers 19 and a uniform contact of dialysate with all the hollow fibers 19.

As mentioned above, a dialyzer is usually installed to have the blood inlet port positioned above the blood outlet port for various reasons. In particular, a dialyzer provided with annular ribs (deflection members) is installed in a vertical position so that the blood inlet port is directed upwardly. Otherwise, the annular ribs would not function properly. A tube of a blood circuit, when connected to the blood inlet port, is bent at some angle due to its flexibility (generally such a tube is made of soft vinyl chloride). As a result, the blood flows down through the blood inlet port in a direction deviated from the vertical axis of the blood inlet port. Consequently the blood cannot be distributed uniformly to the hollow fibers. This phenomenon may take place in the dialyzer according to this invention.

In order to avoid an uneven blood distribution to the fibers 19 due to the above-mentioned reason, the length of the pipe portion 23 of the blood inlet port 21 should better be increased, so that the blood flows vertically down into the cup portion 24. It has been found that the flood flows vertically when the length of the pipe portion 23 is at least about 23 mm.

However, an uneven blood distribution occurs due to not only non-vertical blood flow but also an improper ratio of the volume of the cup portion 24 to the inner diameter of the pipe portion 23 or the broadest cross sectional area of the cup portion 24. That is, an uneven blood distribution to the hollow fibers 19 will takes place if the volume of the cup portion 24 is too large or too small. If the inner diameter $L_1$ of the pipe portion 23 is about 4 mm, the largest inner diameter $L_2$ of the cup portion 24 is about 55 mm, $r_1$ and $r_2$ of curvature are about 3.5 mm and about 8 mm, respectively and the length L of the pipe portion 23 is 23 mm, there occurs no practical uneven blood distribution, provided that the tube connection to the pipe portion 23 is bent at 30° at most.

The support member 27 of FIG. 3 is disposed at least in the area of the annular rib 15 near the dialysate inlet port 17 and in the midst of the hollow fibers 19. The member 27 therefore pushes the fibers 19 onto the inner periphery of the annular rib 15. In other words, the member 27 secures the fibers 19 to the inner periphery of the annular rib 15. The hollow fibers 19 near the support member 27 are put together more densely than in the thin hollow cylinder and more densely than in the thick hollow cylinders 14.

Since the support member 27 pushes away the fibers 19 in the radial direction of the housing 12, a columnar space 28 is formed in the bundle of the fibers 19 between the seal member 20 and the support member 27. The dialysate from the dialysate inlet port 17 flows into the space 28, stays there temporarily and flows uniformly into the gap between any adjacent fibers 19. To facilitate this uniform dialysate distribution among the hollow fibers 19, the inner periphery of the annular rib 15 is tapered in such manner that the fibers 19 may be inclined toward the inner periphery of the thick cylinder 14. Further, the annular rib 15 may be provided at its edge with a plurality of notches 15a as shown in FIG. 2, for example six notches 3 mm wide and 4 mm deep. Then, through these notches 15a the dialysate can flow into and out of the columnar space 28 in any radial directions of the housing 12.

The hollow fibers 19 are flexible and may be easily permanently bent. The permanent curving of the fibers 19 can easily be eliminated by disposing one support member 27 in both annular ribs 15. But the support members 27 must be so arranged as not to form a columnar space extending between them. Should such a columnar space be formed, the dialysate would flow directly from the dialysate inlet port 17 to the dialysate outlet port 18, without flowing uniformly through the gaps between any adjacent fibers 19. In other words, it is desired that the hollow fibers 19 should be dispersed uniformly in the thin hollow cylinder 13 of the housing 12.

The support members 27 are made of foamed urethane, any other elastic material, or cotton. Preferably, the material is light and would not make pinholes in the hollow fibers 19. It is desired that the members 27 are made in the form of a ball and made of a liquid-permeating material. In view of this, foamed urethane is believed to be the best material of the support members 27.

EXAMPLE 1

A dialyzer of such construction as illustrated in FIG. 2 was manufactured to have a blood capacity of about 180 ml and a dialysate capacity of about 300 ml, using 7,000 regenerated cellulose hollow fibers (inner diameter: 300 microns, layer thickness: 16 microns). Dialysate outlet ports of various diameters ranging from 6 mm to 10 mm were used and the diameter of the dialysate inlet port was changed as shown in the Table 1 to see how the urea clearance will change. The blood was supplied at 200 ml/min, and the dialysate was supplied at 500 ml/min. The results were as shown in the following Table 1, wherein "pressure difference" means a pressure drop, i.e. a difference between the pressure at the dialysate inlet and the pressure at the dialysate outlet.

The numerals of urea clearance and Pressure difference indicate an average of ten test samples of the same diameter of the dialysate inlet port.

Table 1

| Diameter of dialysate inlet port (mm) | Urea clearance (ml/min) | Pressure difference (mmHg) |
| --- | --- | --- |
| 8 | 151 | 12 |
| 3.5 | 160 | 20 |
| 3.0 | 164 | 23 |
| 2.5 | 165 | 26 |
| 1.5 | 164 | 48 |
| 1 | 163 | 220 |

As Table 1 shows, when the diameter of the dialysate outlet port and that of the dialysate inlet port ranged from 6 to 10 mm and from about 1.5 to 3.5 mm, the pressure difference did not exceed the permitted limit. It was also ascertained that the urea clearance was improved when the diameters of the dialysate ports were within said ranges.

EXAMPLE 2

Another dialyzer of such construction as illustrated in FIG. 3 was manufactured. This dialyzer is identical with the dialyzer of Example 1 except that both dialysate ports have a diameter of 8 mm and that a ball-like support member as shown in FIG. 3, made of foamed urethane is provided in both annular ribs. Support members of various diameters were alternatively used to see how the urea clearance will change. The blood was supplied at 200 ml/min, and the dialysate was supplied at 500 ml/min. The results were as shown in the following Table 2.

Table 2

| Diameter of support members (mm) | Urea cleanrance (ml/min) | Pressure difference (mmHg) |
| --- | --- | --- |
| 10 | 140-160 | 10 |
| 20 | 140-160 | 10 |
| 30 | 140-162 | 15 |
| 40 | 156-164 | 30 |
| 50 | 158-159 | 30-45 |
| 60 | 156-159 | 50-60 |
| No member used | (135-155) | (10) |

Note: Density of the hollow fibers was about 53% in the thick hollow cylinder.

As Table 2 shows, the larger the elastic members were, the better the urea clearance became. But since the pressure difference became too high when the support members having a diameter of 60 or more were used, the optimum diameter of the support members is believed to be 40 to 50 mm. When support members having a diameter of 40 mm and 50 mm were used, the density of the fibers near the support members was 65% to 70%.

A dialyser is used not only to remove waste materials from blood but also to remove water by ultrafiltration. The water is removed under a difference between the pressure on the blood and the pressure on the dialysate. The pressure difference is controlled in accordance with various physical conditions of the patient, thereby to remove a proper amount of water. This control consists chiefly in adjusting the negative pressure on the dialysate. A negative pressure (i.e. pressure loss) on the dialysate is automatically created in a dialyzer using hollow fibers when the dialysate is supplied at a constant flow rate. As a result, water will be removed from the blood even if no negative pressure is positively exerted on the dialysate. This phenomenon is undesirable when no water is required to be removed from the patient. Accordingly, a dialyzer having hollow fibers should be so designed as to minimize such pressure loss.

The dialyzer according to this invention can reduce such pressure loss to such extent that the pressure loss does not serve to remove water in an alarming amount. Further the dialyzer can be supplied with a dialysate at a higher flow rate than a known dialyzer. Moreover, in the dialyzer of this invention, the channeling of dialysate occurs but to a lesser degree, and the dialysate can come into a uniform contact with all the hollow fibers to thereby elevate the dialysis efficiency.

What we claim is:
1. An artificial kidney comprising:
   a cylindrical housing with both ends open,
   a plurality of spaced apart elongated hollow fibers arranged within the housing substantially parallel to the longitudinal axis of the housing, each of said hollow fibers defining a liquid passage inside the respective hollow fibers and said hollow fibers being arranged to define a liquid passage outside said hollow fibers and between said hollow fibers, said hollow fibers forming a fiber bundle,
   a pair of seal members, one at each end portion of the housing, for securing the end portions of the hollow fibers to the housing in a liquid-tight fashion and for separating said liquid passages inside the hollow fibers from said liquid passage outside the hollow fibers,
   a dialysate inlet port provided at one end of the housing near one of the seal members and communicat- ing with one end of said liquid passage outside the hollow fibers, a dialysate outlet port provided at the other end of the housing near the other seal member and communicating with the other end of said liquid passage outside the hollow fibers, a solution inlet port and a solution outlet port provided at the ends of the housing, respectively and communicating with the liquid passages inside the hollow fibers, means for sealing said solution inlet and outlet ports to the housing and out of liquid communication with the dialysate inlet and outlet ports, and a dialysate deflection or dispersion member disposed at each end of the housing at least within the portion of the housing opposite to and spaced from the respective dialysate inlet and outlet ports for dispersing a flow of dialysate by said dialysate impinging thereagainst, said solution being blood, said dialysate inlet port having a diameter of 1.5 to 3.5 mm and said dialysate outlet port having a diameter of 6 to 10 mm to prevent "channeling" among the hollow fibers in the housing.

2. A dialysis apparatus according to claim 1, wherein said deflection member is in a shape of a ring coaxial with said housing and spaced inwardly from the wall of said housing.

3. An artificial kidney according to claim 2, wherein said dialysate outlet port is near an end of said fiber bundle, and further comprising a support member disposed within said housing, and within and near the end of said fiber bundle near said dialysate outlet port.

4. An artificial kidney according to claim 3, wherein said support member is a ball made of foamed polyurethane.

5. An artificial kidney according to claim 3, further comprising a further support member disposed within said housing, and within and near the other end of said fiber bundle near said dialysate inlet port.

6. An artificial kidney according to claim 5, wherein said further support member is a ball made of foamed polyurethane.

7. An artificial kidney according to claim 1, wherein said solution inlet port is funnel-shaped and comprises a cup portion sealed to said housing and a pipe portion extending from said cup portion and adapted to be connected to a tube, said pipe portion having a length of at least about 23 mm to substantially prevent solution from flowing into said housing in a direction deviated from the axis of said housing.

8. An artificial kidney according to claim 7 wherein the inner diameter of said pipe portion is about 4 mm and the largest inner diameter of said cup portion is about 55 mm.

9. An artificial kidney for blood comprising:

a cylindrical housing with both ends open, a plurality of spaced apart elongated hollow fibers arranged within the housing substantially parallel to the longitudinal axis of the housing, each of said hollow fibers defining a liquid passage inside the respective hollow fibers and said hollow fibers being arranged to define a liquid passage outside said hollow fibers and between said hollow fibers, said hollow fibers forming a fiber bundle, a pair of seal members, one at each end portion of the housing, for securing the end portions of the hollow fibers to the housing in a liquid-tight fashion and for separating said liquid passages inside the hollow fibers from said liquid passage outside the hollow fibers, a dialysate inlet port provided at one end of the housing near one of the seal members and communicating with one end of said liquid passage outside the hollow fibers, a dialysate outlet port provided at the other end of the housing near the other seal member and communicating with the other end of said liquid passage outside the hollow fibers, said dialysate outlet port being near an end of said fiber bundle, a support member generally in the form of a ball and made of foamed polyurethane disposed within said housing, and within and near the end of said fiber bundle near said dialysate outlet port, a funnel-shaped blood inlet port provided at an end of the housing, and communicating with the liquid passages inside the hollow fibers for supplying blood to said liquid passages, a blood outlet port provided at the other end of the housing and communicating with the other ends of the liquid passages inside the hollow fibers for receiving blood from said liquid passages, means for sealing said solution inlet and outlet ports to the housing and out of liquid communication with the dialysate inlet and outlet ports, and a dialysate deflection or dispersion member disposed at each end of the housing at least within the portion of the housing opposite to and spaced from the respective dialysate inlet and outlet ports for dispersing a flow of dialysate by said dialysate impinging thereagainst, said deflection member being in the shape of a ring coaxial with said housing and spaced inwardly from the wall of said housing, said solution being blood, said dialysate inlet port having a diameter of 1.5 to 3.5 mm and said dialysate outlet port having a diameter of 6 to 10 mm to prevent "channeling" among the hollow fibers in the housing.

10. An artificial kidney according to claim 9, further comprising a further support member disposed within said housing, and within and near the other end of said fiber bundle near said dialysate inlet port.

11. An artificial kidney according to claim 10, wherein said further support member is a ball made of foamed polyurethane.

12. An artifical kidney according to claim 9, wherein said solution inlet port is funnel-shaped and comprises a cup portion sealed to said housing and a pipe portion extending from said cup portion and adapted to be connected to a tube, said pipe portion having a length of at least about 23 mm to substantially prevent solution from flowing into said housing in a direction deviated from the axis of said housing.

13. An artificial kidney according to claim 12 wherein the inner diameter of said pipe portion is about 4 mm and the largest inner diameter of said cup portion is about 55 mm.

* * * * *

UNITED STATES PATENT AND TRADEMARK OFFICE
CERTIFICATE OF CORRECTION

PATENT NO. : 4,201,673
DATED : May 6, 1980
INVENTOR(S) : Michio KANNO et al

It is certified that error appears in the above—identified patent and that said Letters Patent is hereby corrected as shown below:

IN THE ABSTRACT:

bridging lines 4 and 5, the word "respectively" should be followed by a -- , --.

IN THE CLAIMS:

Column 7, line 26 (Claim 2), change "A dialysis apparatus" to --An artificial kidney--.

Signed and Sealed this

Fourth Day of November 1980

[SEAL]

Attest:

SIDNEY A. DIAMOND

Attesting Officer

Commissioner of Patents and Trademarks